US012686303B1

(12) United States Patent
Forero Rueda et al.

(10) Patent No.: US 12,686,303 B1
(45) Date of Patent: Jul. 21, 2026

(54) SIDE IMPACT-ABSORBING DEVICE FOR CHILD RESTRAINT SYSTEM

(71) Applicant: GM Global Technology Operations LLC, Detroit, MI (US)

(72) Inventors: Manuel Forero Rueda, Royal Oak, MI (US); Mitesh Lalwala, Sterling Heights, MI (US); Tyler P. Morris, Madison Heights, MI (US); Ryan Aaron Gellner, Livonia, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 19/035,549

(22) Filed: Jan. 23, 2025

(51) Int. Cl.
B60R 21/04 (2006.01)
B60N 2/28 (2006.01)
B60R 21/00 (2006.01)

(52) U.S. Cl.
CPC ........ B60N 2/2884 (2013.01); B60R 21/0428 (2013.01); *B60R 2021/0006* (2013.01); *B60R 2021/006* (2013.01)

(58) Field of Classification Search
CPC .................................................. B60R 21/0428
See application file for complete search history.

(56) References Cited

U.S. PATENT DOCUMENTS

| | | | | |
|---|---|---|---|---|
| 5,527,084 | A | * | 6/1996 | Scherf ................. B60R 21/0428 296/187.05 |
| 7,055,853 | B2 | * | 6/2006 | Honda .............. B60R 21/23138 280/730.2 |
| 10,632,952 | B2 | * | 4/2020 | Markusic .............. B60R 21/231 |
| 2008/0114516 | A1 | * | 5/2008 | Jackson .............. B60R 21/0428 280/736 |
| 2021/0245700 | A1 | * | 8/2021 | Haenel .................. B60R 21/207 |
| 2025/0065838 | A1 | * | 2/2025 | Gomes ................ B60R 21/2342 |

FOREIGN PATENT DOCUMENTS

| | | | | | |
|---|---|---|---|---|---|
| CN | 108569341 | B | * | 12/2022 | ............. B62D 25/20 |
| DE | 4119788 | A1 | * | 7/1992 | ........... B60R 21/216 |
| DE | 4305152 | A1 | | 9/1993 | |
| DE | 19520511 | A1 | | 12/1995 | |
| EP | 1080995 | A2 | * | 3/2001 | ....... B60R 21/23184 |
| EP | 1881915 | B1 | * | 3/2010 | ........ B60R 21/0428 |
| FR | 2744408 | A1 | * | 8/1997 | ........ B60R 21/0428 |
| FR | 3140802 | A1 | * | 4/2024 | ........... B60J 5/0413 |
| JP | 2002527280 | A | * | 8/2002 | ........... B60N 2/4228 |
| JP | 4273604 | B2 | * | 6/2009 | |
| WO | WO-2006122725 | A1 | * | 11/2006 | ........ B60R 21/0428 |

* cited by examiner

*Primary Examiner* — Nicole T Verley
(74) *Attorney, Agent, or Firm* — Honigman LLP; Matthew H. Szalach; Jonathan P. O'Brien

(57) ABSTRACT

A vehicle includes a vehicle body extending along a longitudinal axis, a closure coupled to the vehicle body, a seat coupled to the vehicle body, and a side-impact absorption (SIA) device arranged between the seat and the closure and including a first position and a second position.

6 Claims, 7 Drawing Sheets

SIDE IMPACT-ABSORBING DEVICE FOR CHILD RESTRAINT SYSTEM

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to vehicles and, more particularly, to a restraint system for vehicles.

Child-restraint systems (CRS) are devices designed for young passengers in vehicles. These systems are typically attached to existing passenger seats using various methods, including seat belts and specialized anchor points. One common attachment method involves securing the CRS with one of the seat belts. Additionally, many modern vehicles are equipped with a LATCH (Lower Anchors and Tethers for Children) system, which provides built-in anchors and tethers specifically designed for CRS attachment.

Many CRS are designed with side-impact protection features that often include energy-absorbing materials and side wings that extend around the passenger's head and torso. Further development of vehicle systems and methods is possible and will be addressed by one or more principles of the present disclosure.

SUMMARY

In one configuration, a vehicle is provided and includes a vehicle body extending along a longitudinal axis, a closure coupled to the vehicle body, a seat coupled to the vehicle body, and a side-impact absorption (SIA) device arranged in a gap between the seat and the closure and including a first position and a second position.

The vehicle may include one or more of the following optional aspects. For example, the seat may include a base portion and a seatback coupled to the base portion. The SIA device can be coupled to the base portion and can be movable about an axis that is perpendicular to the longitudinal axis. The SIA device can be coupled to the base portion and can be movable about an axis that is parallel to the longitudinal axis.

According to at least one aspect, the SIA device can be coupled to the closure. The SIA device can occupy the gap between the closure and the seat in the second position.

According to another aspect, the SIA device includes one or more linkages coupled to the closure and a contact plate. A portion of the contact plate can tilt away from the closure in the second position. The contact plate can be rotated away from the closure in the second position.

According to at least one example, the SIA device can be configured to deform or displace a lateral impact load on the vehicle.

In another configuration, a vehicle is provided and includes a vehicle body extending along a longitudinal axis, a closure coupled to the vehicle body, a seat coupled to the vehicle body and including a base portion and a seatback coupled to the base portion, and a side-impact absorption (SIA) device coupled to the seat and including a first position and a second position.

The vehicle may include one or more of the following optional aspects. For example, the SIA device can include a cradle. A portion of the cradle can be axially proud of the base portion in the second position.

According to at least one aspect, the seat can further include an attachment system arranged between the base portion and the seatback. The SIA device can be coupled to the attachment system.

In another configuration, a vehicle is provided and includes a vehicle body extending along a longitudinal axis and including a front passenger compartment and a rear passenger compartment spaced from the front passenger compartment with respect to the longitudinal axis, one or more front passenger compartment doors coupled to the vehicle body and defining a portion of the front passenger compartment, one or more rear passenger compartment doors coupled to the vehicle body and defining a portion of the rear passenger compartment, one or more front seats arranged in the front passenger compartment, one or more rear seats arranged in the rear passenger compartment, and at least one side-impact absorbing (SIA) device arranged in the rear passenger compartment between the one or more rear seats and the one or more rear passenger compartment doors, the SIA device including a deployment mechanism that has a first position and a second position and an energy absorption mechanism coupled to or integrally formed with the deployment mechanism.

The vehicle may include one or more of the following optional aspects. For example, the deployment mechanism and the energy absorption mechanism can each include one or more linkages coupled to one of the rear passenger compartment doors. The energy absorption mechanism can include a contact plate coupled to the one or more linkages.

According to at least one aspect, the energy absorption mechanism can include a deformable body coupled to one of the one or more rear seats and is configured to rotate about an axis that is parallel to the longitudinal axis.

According to at least one aspect, the energy absorption mechanism includes a deformable body coupled to one of the one or more rear seats and is configured to rotate about an axis that is perpendicular to the longitudinal axis.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
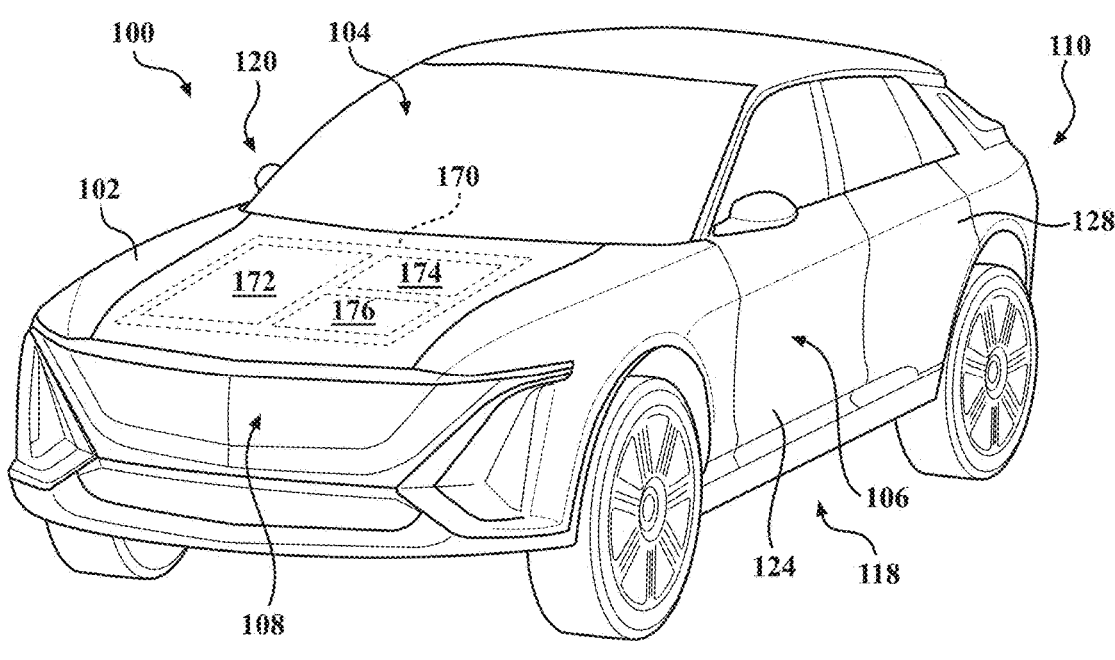
FIG. 1 is a front perspective view of a vehicle according to principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Figure 2:
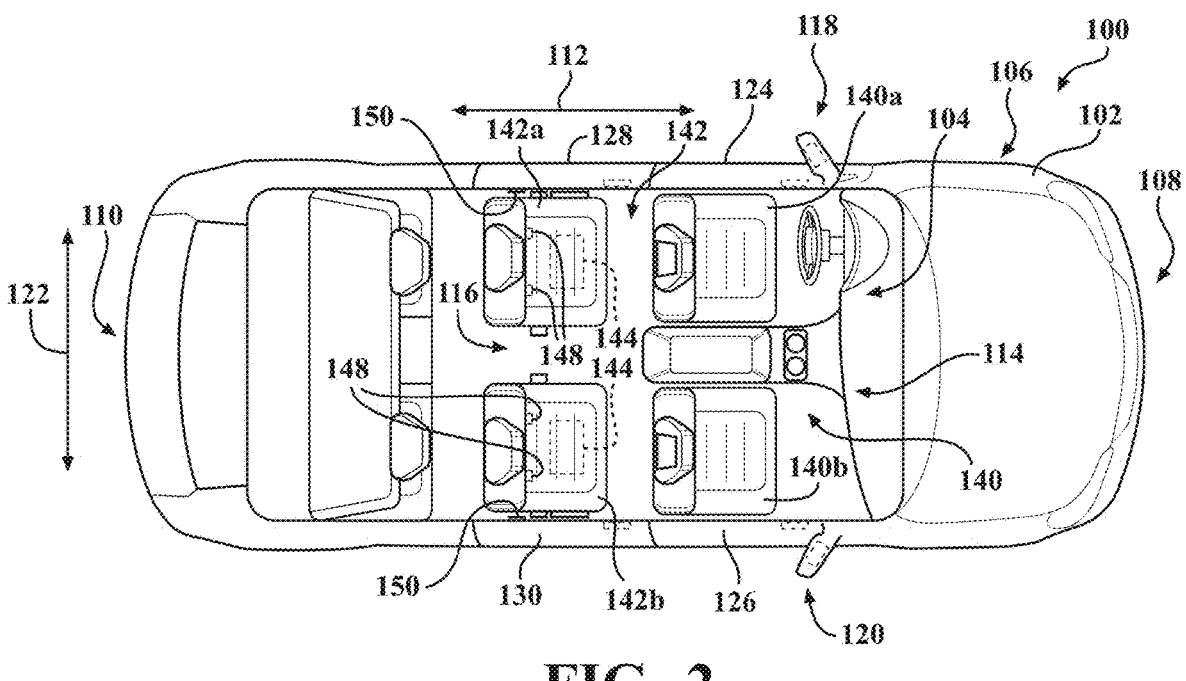
FIG. 2 is a top interior view of the vehicle of FIG. 1 according to the principles of the present disclosure.

With reference to FIG. 1, a vehicle 100 is provided and is shown as including a vehicle body 102 having a vehicle interior 104 and a vehicle exterior 106. The vehicle body 102 has a first or front end 108 spaced fore-aft from a second or rear end 110 with respect to a longitudinal axis 112 (FIG. 2). With reference to FIG. 2, the vehicle 100 has a first or front passenger compartment 114 near the front end 108 and a second or rear passenger compartment 116 spaced fore-aft from the front passenger compartment 114 toward the rear end 110. In this example, the front passenger compartment 114 and the rear passenger compartment 116 each have a first or driver side 118 and a second or co-pilot side 120 spaced cross-car from the driver side 118 with respect to a lateral axis 122. The lateral axis 122 is perpendicular to the longitudinal axis 112. The driver and co-pilot sides 118, 120 may be on different sides (i.e., left or right) of the vehicle 100 in different regions of the world. For the purposes of the present disclosure, the driver side 118 is on the left side and the co-pilot side 120 is on the right side of the vehicle 100 with respect to the lateral axis 122. Note, the present disclosure equally applies to vehicles where the driver side is on the right side of the vehicle and the co-pilot side is on the left side of the vehicle.

Figure 3A:
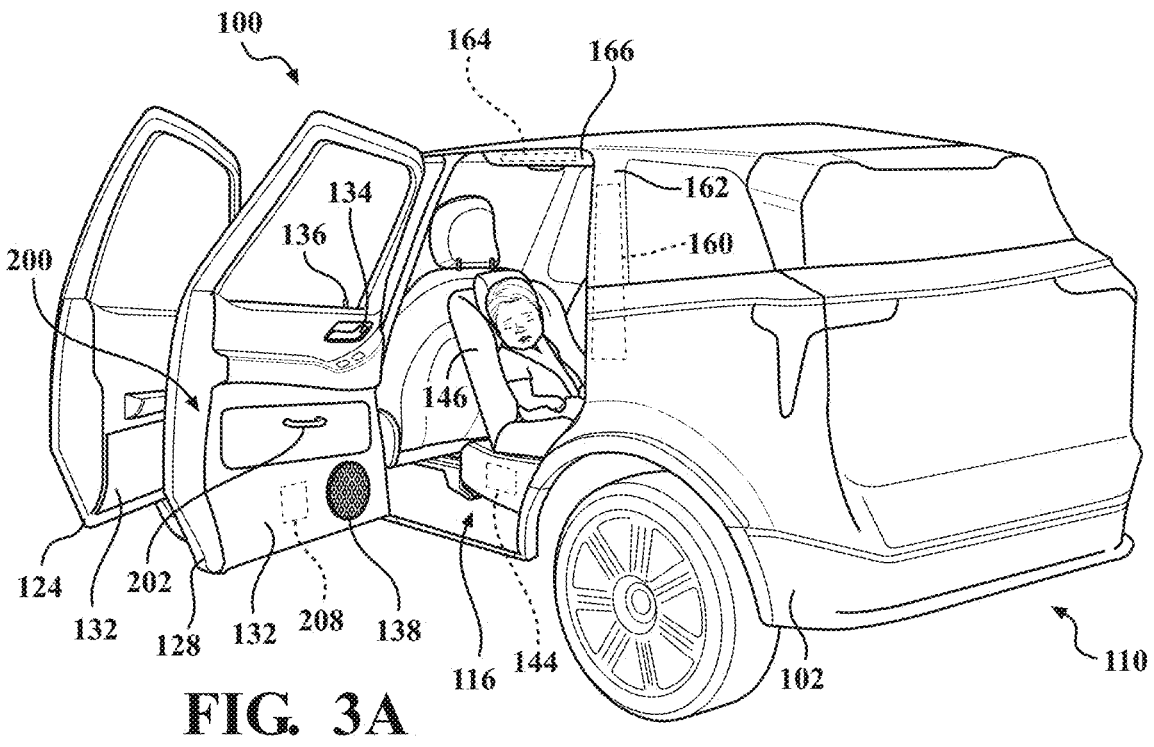
FIG. 3A is a rear perspective view of the vehicle of FIG. 1 showing a side-impact absorbing (SIA) device in a stowed position.
Figure 3B:
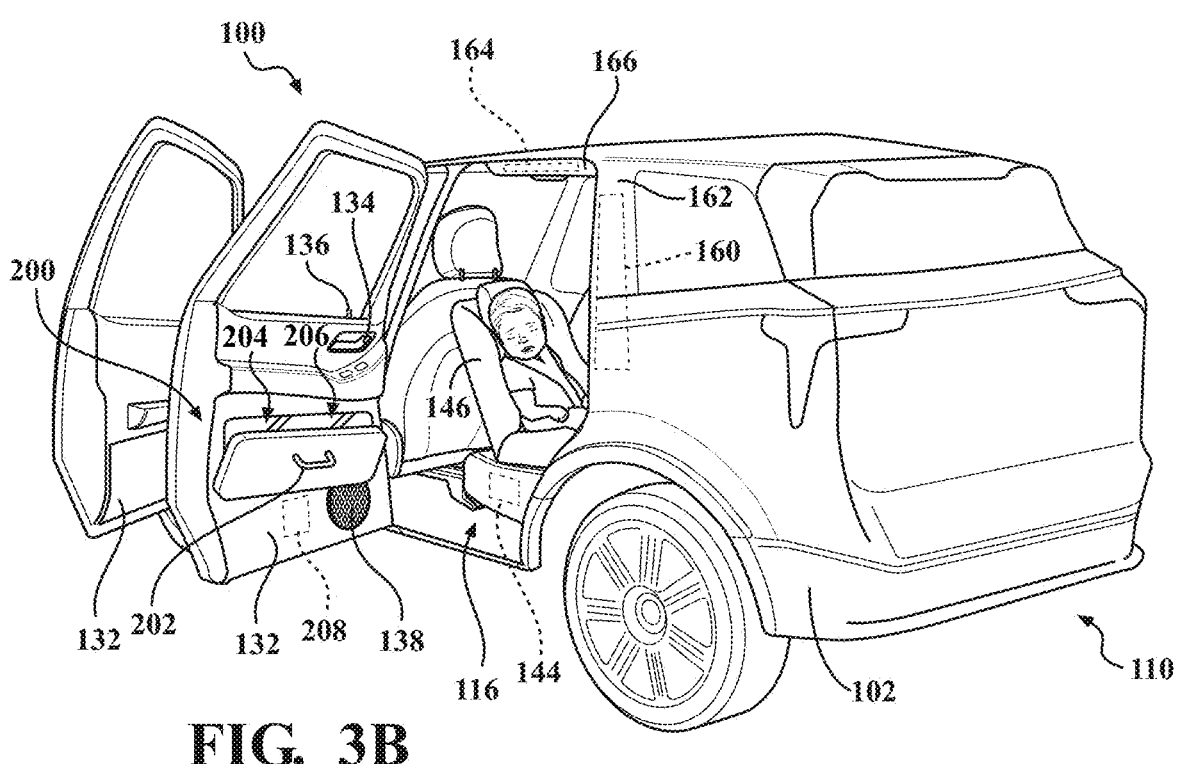
FIG. 3B is a rear perspective view of the vehicle of FIG. 1 showing the SIA device in a deployed position.

With continued reference to FIG. 2, one or more closures (e.g., doors, tailgate, etc.) may be coupled to the vehicle body 102 of the vehicle 100. For instance, a front left passenger compartment door 124 and a front right passenger compartment door 126 may be coupled to the vehicle body 102 to enclose the front passenger compartment 114. Likewise, a rear left passenger compartment door 128 and a rear right passenger compartment door 130 may be coupled to the vehicle body 102 to enclose the rear passenger compartment 116. The front passenger compartment doors 124, 126 and the rear passenger compartment doors 128, 130 may each have an interior door trim 132, which can include one or more door handles 134, a door lock 136, and one or more speakers 138, as shown in FIGS. 3A and 3B.

Figures 6, 7:
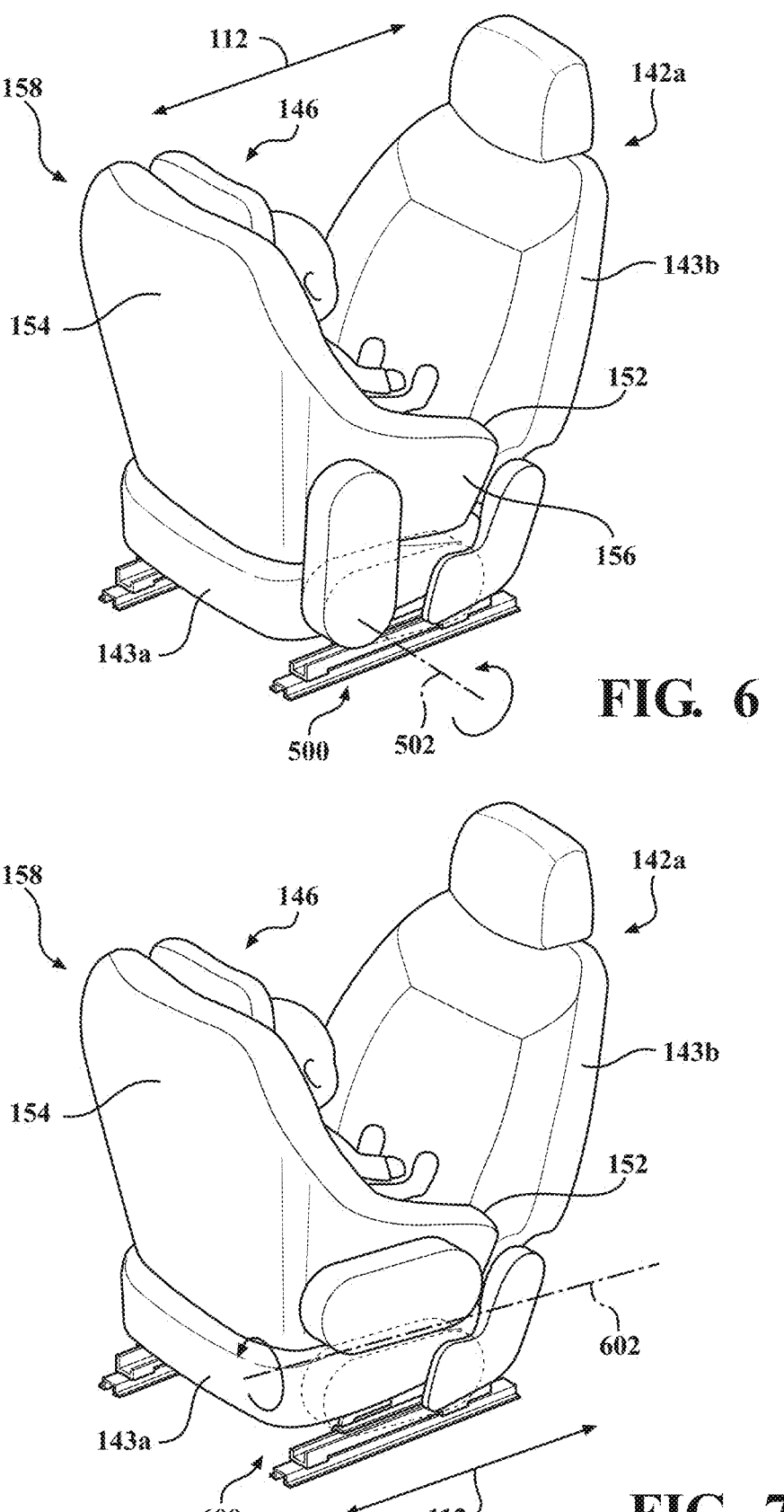
FIG. 6 is a side perspective view of a passenger arranged in a CRS and another configuration of a SIA device arranged in a deployed position.
FIG. 7 is a side perspective view of a passenger arranged in a CRS and another configuration of a SIA device arranged in a deployed position.

With continued reference to FIG. 2, the front passenger compartment 114 may have one or more front seats 140, such as a first or front left seat 140a and a second or front right seat 140b. The rear passenger compartment 116 may have one or more rear seats 142, such as a third or rear left seat 142a arranged fore-aft of the front left seat 140a and a fourth or rear right seat 142b arranged fore-aft of the front right seat 140b. Each of the seats can include a base portion 143a and a seatback or upright portion 143b, as shown in FIG. 6. The base portion 143a can include one or more seat sensors 144 and can include a top surface 143c that is configured to engage with and support a passenger or a child restraint system (CRS) 146. The rear seats 142 can include an attachment system that is configured to retain the CRS 146. For instance, the attachment system can include lower anchors and tethers for children (LATCH) 148 and/or a seat belt 150. The CRS 146 can be configured to be arranged (i.e., installed) on more than one seat within the vehicle 100. In the present illustrative example, the CRS 146 is shown arranged on and will be discussed with respect to the rear left seat 142*a*. Note, the principles of the present disclosure equally apply no matter where the CRS 146 is arranged within the vehicle 100. Additionally, the CRS 146 is rear facing (i.e., a passenger positioned in the CRS faces the rear of the vehicle 100), however, the principles of the present disclosure equally apply to a front-facing CRS as well.

Figure 4:
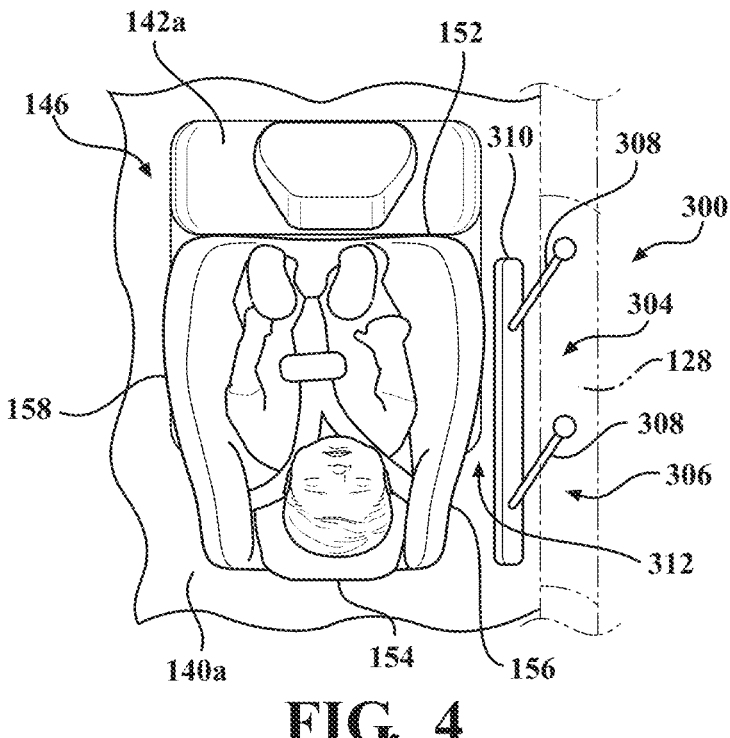
FIG. 4 is a top view of a passenger arranged in a child restraint system (CRS) and a configuration of a SIA device in a deployed position.
Figure 5:
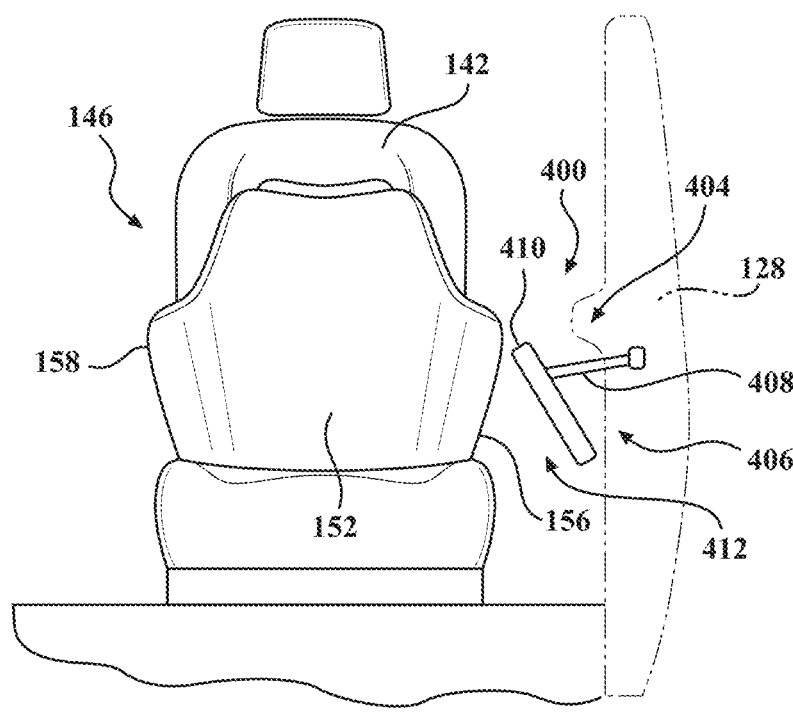
FIG. 5 is a front view of a child restraint system (CRS) and a configuration of a SIA device in a deployed position.

With reference to FIGS. 4 and 5, the CRS 146 can include a first or front end 152 and a rear or second end 154 spaced from the front end 152. The front end 152 is arranged adjacent to the front left seat 140*a* and the rear end 154 is arranged adjacent to the rear left seat 142*a*. The CRS 146 also includes a first or left side 156 and a second or right side 158 spaced from the left side 156. The left and right sides 156, 158 of the CRS 146 each extend between the front end 152 and the rear end 154. As shown in FIG. 4, the CRS 146 is positioned with respect to the rear left seat 142*a* so that the left side 156 is spaced from the interior door trim 132 of the rear left passenger compartment door 128 and the right side 158 faces and is spaced from the rear right passenger compartment door 130.

With reference again to FIGS. 3A and 3B, the vehicle 100 can further include one or more airbags throughout the vehicle interior 104. For instance, in the present illustrative example, the airbags can include one or more side airbags 160 arranged in a support pillar 162 and one or more overhead airbags (e.g., curtain airbags) 164 arranged in a roof rail 166. As shown in FIGS. 3A and 3B, the airbags 160, 164 can be positioned with respect to the rear left seat 142*a*.

As introduced above, the vehicle 100 may include one or more sensors (e.g., cameras, radars, wheel speed sensors, impact sensor, etc.) arranged on or within the vehicle body 102, as shown in FIG. 1. Additionally, the vehicle 100 may be equipped with a vehicle management system 170 (e.g., a telematics unit). A network connection interface 172 may be communicatively coupled to the vehicle management system 170. Some examples of the network connection interface 172 may include twisted pair/fiber optic Ethernet switch, internal/external parallel communication bus, a local area network (LAN) interface, a controller area network (CAN), a media-oriented system transfer (MOST), a local interconnection network (LIN) interface, and the like. Other communication interfaces may also include those that conform with ISO, SAE, and IEEE standards and specifications. The network connection interface 172 enables components of the vehicle management system 170 to send and receive signals with each other and with various systems and subsystems both within or "resident" to the vehicle body 102 and outside or "remote" from the vehicle body 102. The vehicle management system 170 can receive and/or transmit data to/from one or more electronic control units (ECUs) such as a sensor interface module 174, an engine control module, and/or a body control module. The vehicle management system 170 may also communicate with additional ECUs such as a powertrain control module (PCM), a transmission control module, a brake system control module (BSCM), a climate control module (CCM), etc.

The vehicle management system 170 also includes a sensor system 176 that can communicate with the network connection interface 172 directly or via the sensor interface module 174, as shown in FIG. 1. While the vehicle 100 maneuvers about the environment or is at rest within the environment, the sensor system 176 can include various sensor subsystems configured to gather sensor data relating to characteristics of the environment surrounding the vehicle 100 and/or status of the vehicle 100. For instance, the sensor system 176 can include a variety of sensors, such as the seat sensors 144, one or more cameras, and/or one or more impact sensors. The sensor system 176 can be configured to gather information about passengers, such as whether an occupant is present and whether the occupant is a child.

With reference to FIG. 3A, an illustrative example of a side-impact absorbing (SIA) device 200 is provided. The SIA device 200 can be configured to absorb impact energy in the event of a lateral impact event (e.g., a side-impact collision). As shown in FIG. 3A, the SIA device 200 can be hidden or folded unobtrusively within a portion of the vehicle interior 104. For instance, the SIA device 200 can be arranged in a portion of the interior door trim 132 and can be configured to move between a stowed position (FIG. 3A) and a deployed position (FIG. 3B). In the deployed position (FIG. 3B), the SIA device 200 closes a gap between the rear left passenger compartment door 128 and the CRS 146. More particularly, the SIA device 200 closes (i.e., shortens, reduces, etc.) the gap between the interior door trim 132 of the rear left passenger compartment door 128 and the left side 156 of the CRS 146. The SIA device 200 can be deployed or positioned manually by an operator of the vehicle 100 by pulling a handle 202 or automatically (i.e., via a motor) based on data received from one of the seat sensors 144 or another sensor of the sensor system 176.

The SIA device 200 includes a deployment mechanism 204 that is configured to move the SIA device 200 between the stowed and deployed positions (FIGS. 3A and 3B) and an energy absorbing mechanism 206 configured to absorb energy through deformation and/or displacement. The deployment mechanism 204 and/or the energy absorbing mechanism 206 can include a linkage bar mechanism, mechanical joints, inflatable bladders, telescoping components, hydraulics, and/or pneumatics. The deployment mechanism 204 and/or the energy absorbing mechanism 206 can also include a shape forming system with pins, shape conforming foam, energy absorbing foam, frangible elements, flexible elements, and/or deformable metal (e.g., Hexcel®). In some configurations, the deployment mechanism 204 and the energy absorbing mechanism 206 are the same mechanism and in other configurations, the deployment mechanism 204 and the energy absorbing mechanism 206 are separate mechanisms. According to at least one aspect, the SIA device 200 can include one or more sensors 208 that are communicatively coupled to the sensor system 176 and can capture and provide data to the vehicle management system 170 that indicates whether the SIA device 200 is in the stowed position (FIG. 3A) or in the deployed position (FIG. 3B).

FIG. 4 illustrates another illustrative configuration of a side-impact absorbing (SIA) device 300. This configuration is similar in many respects to the configuration of FIGS. 1-3B. Accordingly, the descriptions of the configurations are hereby incorporated into one another, and description of subject matter common to the configurations generally may not be repeated.

With reference to FIG. 4, the SIA device 300 is provided in a deployed position. The SIA device 300 includes a deployment mechanism 304 and an energy absorption mechanism 306. The deployment mechanism 304 can include one or more arms (e.g., linkages) 308 coupled to the rear left passenger compartment door 130 and to a contact panel 310 that faces the CRS 146. More particularly, the one or more arms 308 are hingedly attached to and extend between the contact panel 310 and the rear left passenger compartment door 130. According to one aspect, the one or more arms 308 rotate away from the rear left passenger compartment door 130 and toward the left side 156 of the CRS 146. The one or more arms 308 position the contact panel 310 and reduce the size of a gap 312 that would otherwise be present between the rear left passenger compartment door 130 and the CRS 146. Positioning the contact panel 310 in this manner can help distribute an impact load across the energy absorption mechanism 306.

The energy absorption mechanism 306 can include the one or more arms 308 and/or the contact panel 310. Ordinarily, impact loads would be passed directly to the CRS 146. Here, the one or more arms 308 and/or the contact panel 310 can be configured to deform and/or displace energy and, thus, reduce and/or eliminate an impact load passed to the CRS 146.

FIG. 5 illustrates another illustrative configuration of a side-impact absorbing (SIA) device 400. This configuration is similar in many respects to the configuration of FIGS. 1-3B and FIG. 4. Accordingly, the descriptions of the configurations are hereby incorporated into one another, and description of subject matter common to the configurations generally may not be repeated.

With reference to FIG. 5, the SIA device 400 is provided in a deployed position. The SIA device 400 includes a deployment mechanism 404 and an energy absorbing mechanism 406. The deployment mechanism 404 can include one or more arms (e.g., linkages) 408 coupled to the rear left passenger compartment door 130 and to a contact panel 410 that faces the left side 156 of the CRS 146. More particularly, the one or more arms 408 are hingedly attached to and extend between the contact panel 410 and the rear left passenger compartment door 130. According to one aspect, the one or more arms 408 tilt a portion of the contact panel 410 away from the rear left passenger compartment door 130 and toward the CRS 146. The one or more arms 408 position the contact panel 410 and reduce the size of a gap 412 that would otherwise be present between the rear left passenger compartment door 130 and the CRS 146. Positioning the contact panel 410 in this manner can help distribute an impact load across the energy absorbing mechanism 406.

The energy absorption mechanism 406 can include the one or more arms 408 and/or the contact panel 410. Ordinarily, impact loads would be passed directly to the CRS 146. Here, the one or more arms 408 and/or the contact panel 410 can be configured to deform and/or displace energy and, thus, reduce and/or eliminate an impact load passed to the CRS 146.

FIG. 6 illustrates another illustrative configuration of a side-impact absorbing (SIA) device 500. This configuration is similar in many respects to the configuration of FIGS. 1-3B, FIG. 4, and FIG. 5. Accordingly, the descriptions of the configurations are hereby incorporated into one another, and description of subject matter common to the configurations generally may not be repeated.

With reference to FIG. 6, the CRS 146 is arranged on the rear left seat 142a between the base portion 143a and the seatback 143b. The SIA device 500 is shown coupled to a portion of the base portion 143a and rotatable between a first or stowed position (shown in dotted lines) and a second or deployed position (shown in solid lines). According to one aspect, the SIA device 500 is movable about an axis 502 that is perpendicular to the longitudinal axis 112. According to one aspect, the SIA device 500 can be coupled to the base portion 143a with a hinge or another mechanism that allows the SIA device 500 to be stowed and deployed by an operator of the vehicle or automatically based on information gathered from the sensor system 176. The SIA device 500 can also include a spring and/or latch mechanism to lock the SIA device 500 in the deployed position or in the stowed position.

The SIA device 500 can be configured to provide support and energy absorption for lateral motion by bending and/or deforming. According to at least one aspect, the SIA device 500 is a deformable body where the internal structure and material surrounding the structure can act together to brace the CRS 146 and absorb lateral motion. The internal structure of the SIA device 500 can be composed of a relatively rigid material that can be configured to deform to absorb energy and the external structure can be composed of a combination of soft (i.e., cushioned) and energy absorption materials.

The present illustrative example shows the SIA device 500 arranged on one side of the rear left seat 142a, however, in another configuration another SIA device 500 could be arranged on the opposite side of the rear left seat 142a. This arrangement may be desirable to account for far-side impact (i.e., impact from the opposite or co-pilot side 120 of the vehicle 100).

FIG. 7 illustrates another illustrative configuration of a side-impact absorbing (SIA) device 600. This configuration is similar in many respects to the configuration of FIGS. 1-3B, FIG. 4, FIG. 5, and FIG. 6. Accordingly, the descriptions of the configurations are hereby incorporated into one another, and description of subject matter common to the configurations generally may not be repeated.

With reference to FIG. 7, the CRS 146 is arranged on the rear left seat 142a between the base portion 143a and the seatback 143b of the rear left seat 142a. The SIA device 600 is shown coupled to a portion of the base portion 143a and rotatable between a first or stowed position (shown in dotted lines) and a second or deployed position (shown in solid lines). According to one aspect, the SIA device 600 is movable about an axis 602 that is parallel to the longitudinal axis 112. According to one aspect, the SIA device 600 can be coupled to the base portion 143a with a bar linkage system that allows the SIA device 600 to be stowed and deployed by an operator of the vehicle or automatically based on information gathered from the sensor system 176. The SIA device 600 can also include a spring and/or latch mechanism to lock the SIA device 600 in the deployed position or in the stowed position.

The SIA device 600 can be configured to provide support and energy absorption for lateral motion by bending and/or deforming. According to at least one aspect, the SIA device 600 is a deformable body where the internal structure and material surrounding the structure can act together to brace the CRS 146 and absorb lateral motion. The internal structure of the SIA device 600 can be composed of a relatively rigid material that can be configured to deform to absorb energy and the external structure can be composed of a combination of soft (i.e., cushioned) and energy absorption materials.

The present illustrative example shows the SIA device 600 arranged on one side of the rear left seat 142a, however, in another configuration, another SIA device 600 could be arranged on the opposite side of the rear left seat 142a. This arrangement may be desirable to account for far-side impact (i.e., impact from the opposite or co-pilot side 120 of the vehicle 100).

Figure 8A:
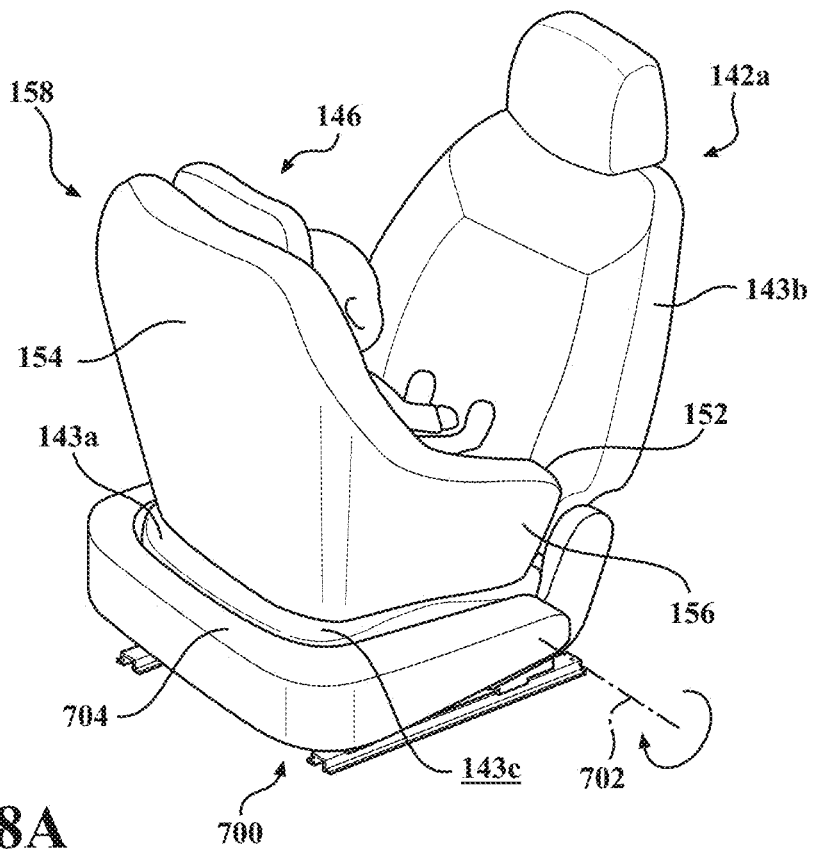
FIG. 8A is a side perspective view of a passenger arranged in a CRS and another configuration of a SIA device arranged in a stowed position.
Figure 8B:
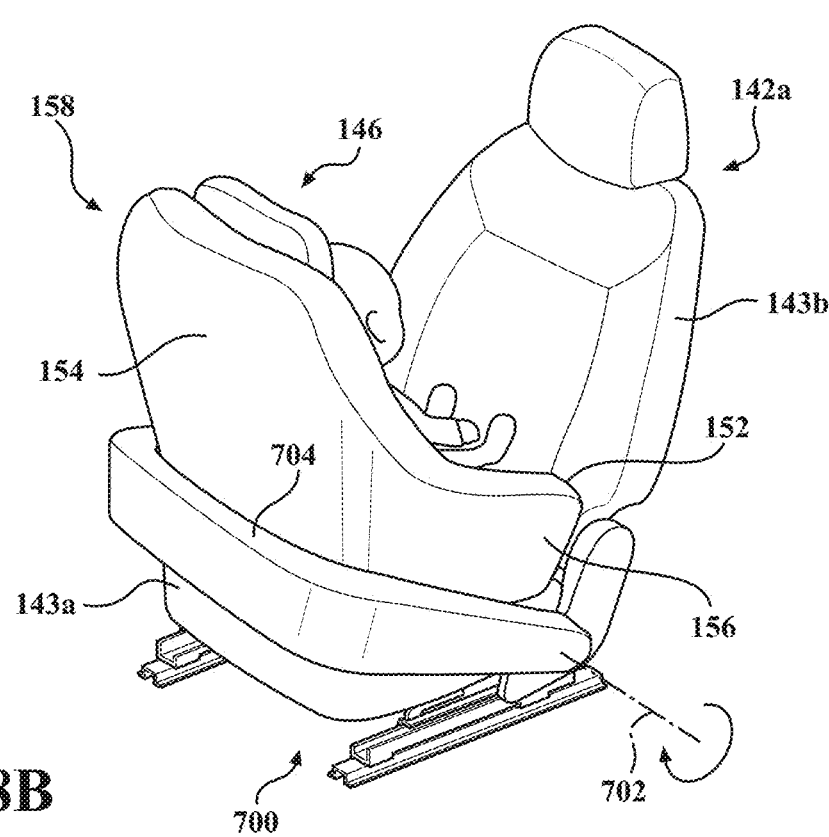
FIG. 8B is a side perspective view of the CRS and the SIA device of FIG. 4 and the SIA device is in a deployed position.

FIGS. 8A and 8B illustrate another illustrative configuration of a side-impact absorbing (SIA) device 700. This configuration is similar in many respects to the configuration of FIGS. 1-3B, FIG. 4, FIG. 5, FIG. 6, and FIG. 7. Accordingly, the descriptions of the configurations are hereby incorporated into one another, and description of subject matter common to the configurations generally may not be repeated.

With reference to FIGS. 8A and 8B, the CRS 146 is arranged on the rear left seat 142*a* between the base portion 143*a* and the seatback 143*b* of the rear left seat 142*a*. In the present illustrative example, the SIA device 700 is coupled to and cradles a portion of the base portion 143*a*. According to one aspect, the SIA device 700 wraps around at least three sides of the base portion 143*a* and is coupled to the base portion 143*a* so that the SIA device 700 can rotate about an axis 702 arranged perpendicular to the longitudinal axis 112. The SIA device 700 is movable between a first or stowed position (FIG. 8A) and a second or deployed position (FIG. 8B). In the stowed position (FIG. 8A), a top side 704 of the SIA device 700 is in line with or below a top surface 143*c* of the base portion 143*a*. In the deployed position (FIG. 8B), the top side 704 of the SIA device is axially proud of the top surface 143*c* of the base portion 143*a*. Additionally, in the deployed position (FIG. 8B), the SIA device 700 wraps around at least three sides of the CRS 146. In other words, the SIA device 700 contacts or is arranged adjacent to at least the rear end 154, the left side 156, and the right side 158. This arrangement can be desirable to protect the CRS 146 from lateral impact from the near side (i.e., driver side 118) and the far side (co-pilot side 120).

The SIA device 700 can be configured to provide support and energy absorption for lateral motion by bending and/or deforming. The internal structure of the SIA device 700 and material surrounding the structure can act together to brace the CRS 146 and absorb lateral motion. The internal structure of the SIA device 700 can be composed of a relatively rigid material that can be configured to deform to absorb energy and the external structure can be composed of a combination of soft (i.e., cushioned) and energy absorption materials.

Figure 9:
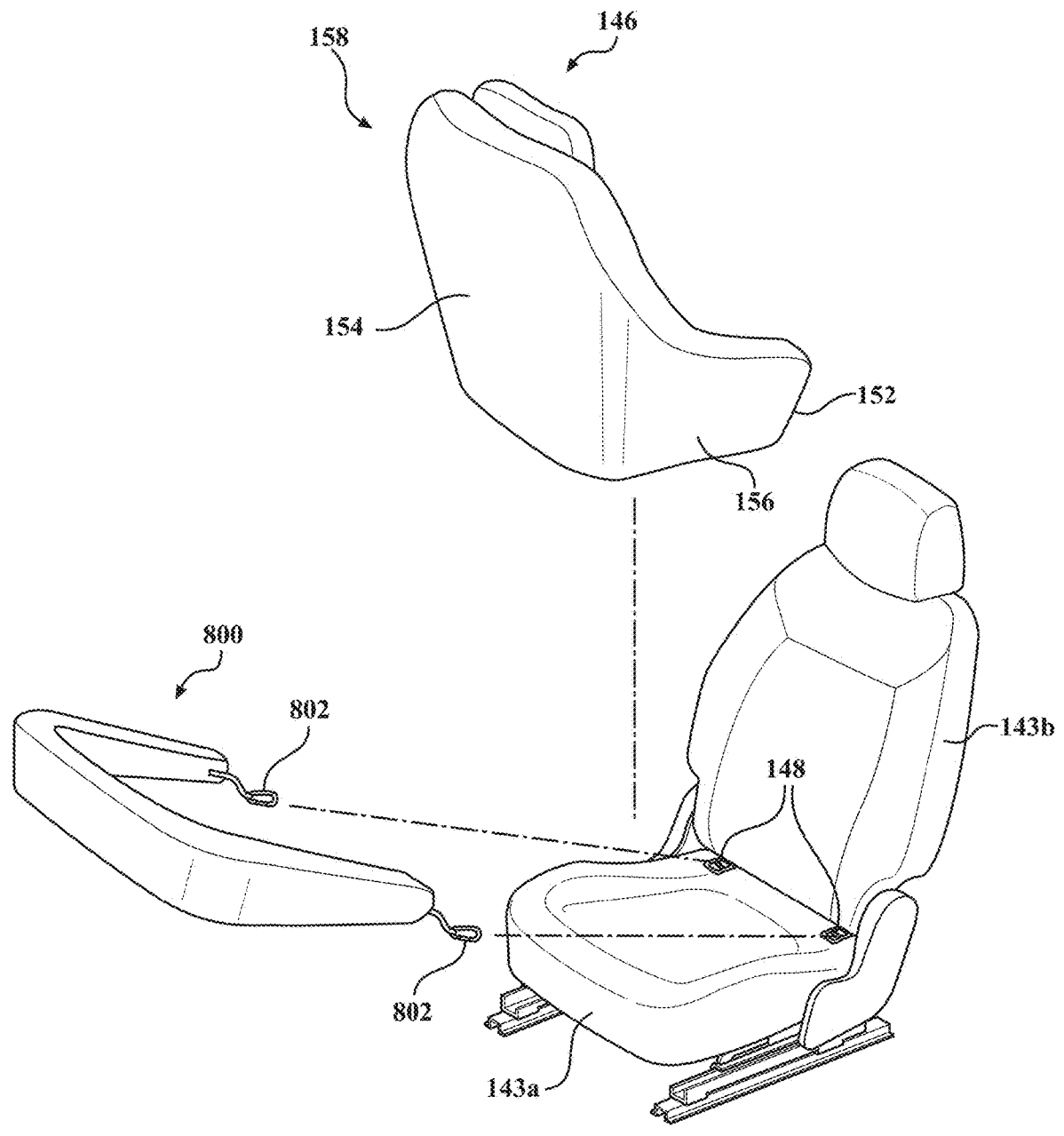
FIG. 9 is a partial exploded view comprising a CRS, a removable SIA device, and a passenger seat according to the principles of the present disclosure.

FIG. 9 illustrates another illustrative configuration of a side-impact absorbing (SIA) device 800. This configuration is similar in many respects to the configuration of FIGS. 1-3B, FIG. 4, FIG. 5, FIG. 6, FIG. 7, and FIGS. 8A and 8B. Accordingly, the descriptions of the configurations are hereby incorporated into one another, and description of subject matter common to the configurations generally may not be repeated.

With reference to FIG. 9, the CRS 146 configured to be arranged on the rear left seat 142*a* between the base portion 143*a* and the seatback 143*b* of the rear left seat 142*a*. The SIA device 800 is similar to the previous configuration in that it is configured to cradle a portion of the CRS 146. Here, however, the SIA device 800 is removably coupled to the attachment system (e.g., the latch system 148) prior to the CRS 146 being installed to the attachment system. In other words, the SIA device 800 is removable from the vehicle 100 when the CRS 146 is not being used, for example. In the present illustrative example, the SIA device 800 can include clips or hooks 802 that engage with the latch system 148. In other configurations, the seat belt 150 (FIG. 2) can be used to couple the SIA device 800 to the rear left seat 142*a*, for example.

The SIA device 800 can be configured to provide support and energy absorption for lateral motion by bending and/or deforming. The internal structure of the SIA device 800 and material surrounding the structure can act together to brace the CRS 146 and absorb lateral motion. The internal structure of the SIA device 800 can be composed of a relatively rigid material that can be configured to deform to absorb energy and the external structure can be composed of a combination of soft (i.e., cushioned) and energy absorption materials.

Figure 10:
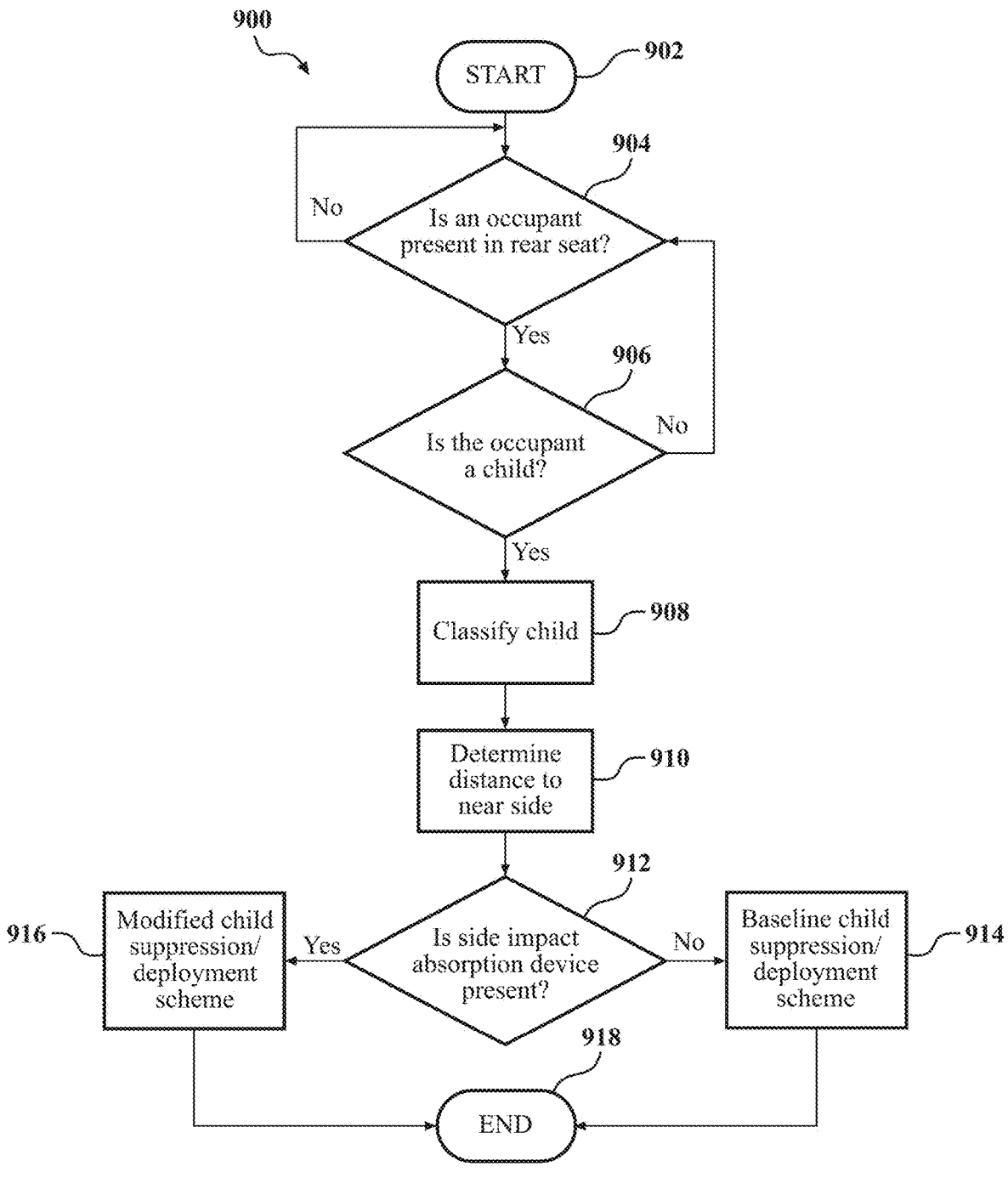
FIG. 10 is a flow chart of a method of controlling a restraint system of a vehicle according to the principles of the present disclosure.

With reference to FIG. 10, a method 900 of controlling the one or more airbags (e.g., the side airbags 160 and the overhead airbags 164) of the vehicle 100 is provided.

The method begins at 902. In practical terms, the method 900 begins when the vehicle 100 is unlocked or at any point when a passenger is in the vehicle interior 104.

At 904, the vehicle management system 170 is configured to determine whether an occupant is present in one of the rear seats 142. This can be accomplished by evaluating data gathered by the sensor system 176, for example.

At 906, the vehicle management system 170 is configured to determine whether the occupant is a young passenger (i.e., a child). This can be accomplished by evaluating data gathered by the sensor system 176, for example. If a child is present, then the method 900 continues to 908.

At 908, the vehicle management system 170 classifies the child. More particularly, the vehicle management system 170 determines whether the child is arranged in a front-facing (FF) CRS, a rear-facing (RF) CRS, or in a booster seat. Again, this can be determined by evaluating data gathered by the sensor system 176, for example.

At 910, the vehicle management system 170 determines a distance (i.e., gap) between the passenger, the CRS 146, and/or the rear left seat 142*a* and the nearest side of the vehicle 100 (e.g., the interior door trim 132). The distance can be determined by using one or more sensors of the sensor system 176, for example.

At 912, the vehicle management system 170 determines whether the SIA device 200, 300, 400, 500, 600, 700, 800 is present.

At 914, if the SIA device 200, 300, 400, 500, 600, 700, 800 is not present in the vehicle 100 then the vehicle management system 170 can utilize a baseline child suppression and airbag deployment scheme.

At 916, if the SIA device 200, 300, 400, 500, 600, 700, 800 is present in the vehicle 100 and in a deployed position then the vehicle management system 170 can utilize a modified child suppression and airbag deployment scheme.

At 918, the method 900 ends.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:
1. A vehicle, comprising:
   a vehicle body extending along a longitudinal axis;
   a closure coupled to the vehicle body and including an interior door trim;
   a seat coupled to the vehicle body; and a side-impact absorption (SIA) device including a stowed position and a deployed position and configured to deform in response to a lateral impact load on the vehicle when arranged in a gap located directly between the seat and the closure, the SIA device comprising:

(i) a pair of hinges coupled to the closure, (ii) a pair of linkages coupled to the hinges, and (iii) a contact panel coupled to the linkages, the contact panel being a discrete panel separate from the interior door trim of the closure and including a handle, wherein the SIA device is configured to be manually deployed by an operator, via the handle, such that the pair of hinges rotate the SIA device from the stowed position to the deployed position so that the contact panel occupies the gap prior to a lateral impact event.

2. The vehicle of claim 1, wherein the seat includes a base portion and a seatback coupled to the base portion.

3. The vehicle of claim 1, wherein a portion of the contact panel tilts away from the closure in the deployed position.

4. A vehicle, comprising:

a vehicle body extending along a longitudinal axis and including a front passenger compartment and a rear passenger compartment spaced from the front passenger compartment with respect to the longitudinal axis;

one or more front passenger compartment doors coupled to the vehicle body and defining a portion of the front passenger compartment;

one or more rear passenger compartment doors coupled to the vehicle body and defining a portion of the rear passenger compartment and including an interior door trim;

one or more front seats arranged in the front passenger compartment;

one or more rear seats arranged in the rear passenger compartment; and at least one side-impact absorption (SIA) device arranged in the rear passenger compartment between the one or more rear seats and the one or more rear passenger compartment doors, the SIA device including:

(A) a deployment assembly that has a stowed position and a deployed position, the deployment assembly comprising:

(i) a pair of hinges coupled to one of the rear passenger compartment doors, and (ii) a pair of linkages that each include a proximal end coupled to one of the hinges and a distal end spaced from the proximal end, and (B) an energy absorption mechanism including a contact panel that has a handle and is coupled to or integrally formed with the deployment assembly, the contact panel being a discrete panel separate from the interior door trim of the one or more rear passenger compartment doors, wherein the SIA device is configured to be manually deployed by an operator, via the handle, such that the pair of hinges rotate the deployment assembly from the stowed position to the deployed position so that the contact panel occupies a gap directly between the one or more rear seats and the one or more rear passenger compartment doors prior to a lateral impact event.

5. The vehicle of claim 4, wherein a portion of the contact panel tilts away from one of the one or more rear passenger compartment doors in the deployed position.

6. The vehicle of claim 4, wherein the linkages and/or the contact panel are configured to deform and absorb energy during a lateral impact.

* * * * *